H. F. PERKINS.
SYSTEM OF DISTRIBUTION.
APPLICATION FILED MAY 5, 1913.
1,160,750.
Patented Nov. 16, 1915.
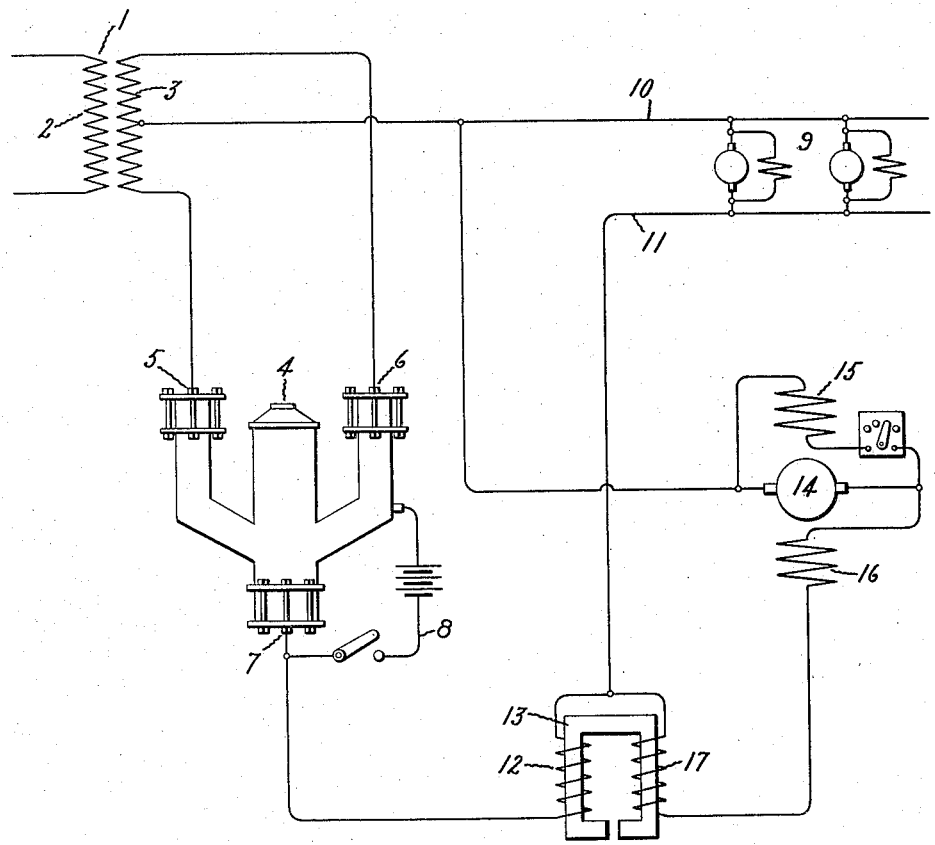
Witnesses:
Earl G. Klock.
J. Ellis Glen.
Inventor:
Harry F. Perkins,
by Albert G. Davis
His Attorney.

UNITED STATES PATENT OFFICE.

HARRY F. PERKINS, OF SCHENECTADY, NEW YORK, ASSIGNOR TO GENERAL ELECTRIC COMPANY, A CORPORATION OF NEW YORK.

SYSTEM OF DISTRIBUTION.

1,160,750.      Specification of Letters Patent.      Patented Nov. 16, 1915.

Application filed May 5, 1913. Serial No. 765,448.

*To all whom it may concern:*

Be it known that I, HARRY F. PERKINS, a citizen of the United States, residing at Schenectady, county of Schenectady, State of New York, have invented certain new and useful Improvements in Systems of Distribution, of which the following is a specification.

My invention relates to systems of distribution, and more particularly to systems wherein vapor electric apparatus is operated in parallel with electric generators for supplying translating devices.

At the present time, improvements have been made in vapor electric apparatus, as the well known mercury arc rectifier, for example, so that it is now possible to construct and operate such apparatus of far greater capacity than it was possible to do until comparatively recently. When such large capacity apparatus is used, it becomes desirable at times to operate in conjunction or parallel with it for feeding a common load an electric generator or generators, the apparatus and the generators being connected in parallel so that each may supply a portion of the load. Such operation is in general similar to the operation of two or more electric generators connected in parallel. It is a well-known fact, however, that vapor electric apparatus fed from an alternating current system does not regulate so closely as the electric generator, and furthermore, when operating in parallel with such a generator it tends to deliver a constant current. When such apparatus, therefore, is operated in parallel with an electric generator for supplying a common load, as the common load decreases, the load on the vapor apparatus will not decrease at the rate the generator current decreases and will thus supply more than its proportion of it, and, as the load further decreases, it may supply energy to the generator which will then operate as a motor. It thus becomes difficult to operate such apparatus in parallel with an electric generator.

When the generator is a compound wound generator or rotary converter, such parallel operation becomes practically impossible. This arises from the fact that when the motoring action mentioned above occurs, the series field of the generator or rotary converter will oppose the shunt field, and, as a result, the converter or generator may attain a dangerously high speed, as it will be operating with substantially no field. In any case there will be a short circuit which will shut down the system.

For an increase of load, the generator will maintain its voltage substantially constant for whatever value it may have been designed, whereas the voltage of the vapor electric apparatus will decrease. The generator will, therefore, supply more and more of the common load, inasmuch as its voltage will remain a substantially predetermined quantity, whereas the voltage of the vapor electric apparatus will continually tend to decrease and the current will remain constant irrespective of the common load.

One object of my invention is to provide means for operating a vapor electric apparatus in parallel with an electric generator, each supplying a common load, in such a way that both the apparatus and the generator will each supply its part of the load no matter how the load may vary.

A further object of my invention is to provide a means, whereby whatever the variations of the common load, the vapor electric apparatus will always supply a portion of the same and never cease functioning. The means which I prefer to employ consists of a reactance which is connected in series with the supply circuit of the vapor apparatus, and in operative relation with this reactance a means which I prefer to construct as a coil connected in series with the supply circuit of the generator and in inductive relation with the reactance, so arranged that when the load decreases the effect of the reactance will be increased and thus the voltage supplied by the vapor apparatus will be decreased and the vapor apparatus will, therefore, still only supply its portion of the load. If the load increases, the effect of the reactance will be decreased and the voltage supplied by the vapor apparatus increased so that it will supply its part of the load under these changed conditions.

My invention is also applicable for systems where it is desired to employ a generator or rotary converter having a series field, to supply the load in conjunction with a vapor electric apparatus, and especially for conditions where when normal or less than normal load is supplied, it is desired to have the vapor apparatus supply practically all of this, but when the load becomes greater than normal, to have the generator supply this excess. In other words, my invention is applicable to a system in which a generator is used to supply a peak load which may occur with the operation of a vapor electric apparatus.

For a further understanding of my invention, reference may be made to the accompanying drawing, which shows diagrammatically a system employing my invention.

1 is a single phase transformer having a primary winding 2, which may be fed from a suitable source of supply, not shown, and a secondary winding 3 supplying the vapor electric apparatus 4 which is here illustrated as consisting of a single phase mercury arc rectifier of high capacity. The secondary winding 3 is connected to the anodes 5 and 6 of the apparatus. The apparatus is used in the well-known fashion for rectifying an alternating to a direct current, the direct current circuit terminals being the middle point of the winding 3 and cathode 7 of the apparatus.

8 is a starting circuit for starting the apparatus in the well-known manner. It is obvious that while I have for convenience illustrated a single phase rectifier that a polyphase rectifier may equally well be employed.

The apparatus supplies a plurality of translating devices 9 constituting the load, which is here shown diagrammatically as a plurality of shunt-wound motors, but any desired translating devices may be used. This load is shown as connected to the center point of the transformer winding 3 by conductor 10 and to the cathode of the vapor apparatus by a conductor 11, connected in series with which is a reactance comprising a coil 12 and in inductive relation thereto a magnetic core 13. Also supplying the load and connected in parallel with the vapor apparatus is shown an electric generator which is diagrammatically illustrated as a compound wound generator comprising the armature 14, the shunt field 15 and the series field 16 and which may be driven in any suitable manner which has not been illustrated.

Connected in series between the series field 16 and the conductor 11 is shown the coil 17, which if desired, may consist of a plurality of coils placed on various parts of the core and wound in inductive relation to the reactance connected in series with the vapor apparatus supply circuit and is shown as wound upon the core 13 which may contain one or more air gaps. This is wound in such a fashion that it opposes the reactive flux set up by the coil 12 in the core and hence varies the value of the reactance with the variation of the load.

The principle upon which my invention operates is as follows: When the apparatus is supplying a direct current load, the core 13 will be magnetized by the coil 12 with a unidirectional flux which will pulsate but which will have a certain minimum value. The coil 17, in series with the supply circuit of the generator, will also magnetize the core 13 with a unidirectional flux which will oppose the flux set up by the coil 12. The coils and magnetic circuit will be so designed that for a given load the reactance and regulation will be of a predetermined value. If the load decreases, due to the poor regulation of the alternating current supply, the effect produced by the reactance will be greatest for the rectifier and will thus tend to decrease its supply voltage. This will be so because the generator, having a better regulation due to the well known compounding effect of the series field winding 16, its supply current will tend to decrease and thus the effect of the coil 17 will become proportionately less than under the assumed condition. Due to the decrease of magnetization of the core 13 by the coil 17 the reactive flux produced by the coil 12 will be proportionately greater, thereby increasing the reactance of the coil 12 and decreasing the supply voltage of the vapor apparatus. If, however, the load increases, the effect of the coil 17 will become greater in proportion and it will tend to decrease the reactive flux in the core 13 so that the reactance of the coil 12 will be decreased.

It will be readily seen that the vapor apparatus and the generator will each supply a part of the load and that as the load decreases the current supplied by the vapor apparatus will decrease, so that there will be no tendency for the generator to operate as a motor, and further, as the load increases, the vapor apparatus will still supply its portion thereof and never cease functioning.

While, for purposes of convenience of illustration, I have described my invention as applied to the operation of a single phase mercury arc rectifier and a single compound wound generator, it is obvious that my invention is not limited for use with these two particular forms of apparatus, but may be used with other forms which will suggest themselves to those skilled in the art, and which I seek to cover in the appended claims.

What I claim as new and desire to secure by Letters Patent of the United States, is:

1. In combination, translating devices constituting a load, a vapor electric apparatus supplying the same, a direct current electric generator operable as a motor also supplying the same, a reactance having a magnetic core in series with the supply circuit of said apparatus, and a coil in series with the generator supply circuit wound upon said core so as to oppose the reactive flux in the core.

2. In combination, translating devices constituting a load, a vapor electric apparatus supplying the same, an electric generator operable as a motor having a series field also supplying the same, a reactance having a magnetic core in series with the supply circuit of said apparatus, and a coil in series with the generator supply circuit wound upon said core so as to oppose the reactive flux in the core.

3. In combination, translating devices, a mercury vapor rectifier supplying the same, a compound wound direct current electric generator also supplying the same, a reactive coil in series with the supply circuit of the rectifier, and a second coil in series with the generator supply circuit in inductive relation to the reactive coil and producing a magnetic flux in opposition to that of the reactive coil.

4. The combination of a source of alternating current, a rectifier delivering a pulsating current connected thereto, a direct current generator, a load supplied in common by the rectifier and the generator, a reactive coil in series with the rectifier, a magnetizing coil in series with the generator, and a common core for both said coils, whereby a change of current in the magnetizing coil changes the reactance of the reactive coil and thereby the wave form of the rectified current flowing therein.

In witness whereof, I have hereunto set my hand this 3rd day of May, 1913.

HARRY F. PERKINS.

Witnesses:
BENJAMIN B. HULL,
HELEN ORFORD.

Copies of this patent may be obtained for five cents each, by addressing the "Commissioner of Patents, Washington, D. C."